(12) United States Patent
Hoffman et al.

(10) Patent No.: US 6,214,389 B1
(45) Date of Patent: Apr. 10, 2001

(54) PROCESS FOR MANUFACTURING SLAB-TYPE CHEWING GUM PRODUCTS

(75) Inventors: Earl Roger Hoffman, Machesney Park; Anita Friberg, Roscoe, both of IL (US); Marc Degady, Morris Plains, NJ (US)

(73) Assignee: Warner-Lambert Company, Morris Plains, NJ (US)

(*) Notice: Subject to any disclaimer, the term of this patent is extended or adjusted under 35 U.S.C. 154(b) by 0 days.

(21) Appl. No.: 09/306,920

(22) Filed: May 7, 1999

Related U.S. Application Data

(62) Division of application No. 08/774,571, filed on Dec. 31, 1996, now Pat. No. 5,971,739.

(51) Int. Cl.[7] .................................................. A23G 3/00
(52) U.S. Cl. .......................... 426/5; 426/414; 426/516; 426/517
(58) Field of Search ................................ 426/5, 516, 524, 426/660, 414, 517; 425/337, 327, 363

(56) References Cited

U.S. PATENT DOCUMENTS

| | | |
|---|---|---|
| 2,215,575 | 9/1940 | Bowman . |
| 2,303,987 | 11/1942 | Neller . |
| 2,409,997 | 10/1946 | Straubel, Sr. . |
| 2,410,189 | 10/1946 | Straubel et al. . |
| 2,771,637 | 11/1956 | Silvasy et al. . |
| 2,829,606 | 4/1958 | Dielentheis . |
| 3,248,198 | 4/1966 | Jamnik et al. . |
| 3,455,755 | 7/1969 | Phillips . |
| 3,553,058 | 1/1971 | Good . |
| 3,652,377 | 3/1972 | Helmick . |
| 3,806,290 | 4/1974 | Graff et al. . |
| 3,857,963 | 12/1974 | Graff et al. . |
| 3,904,336 | 9/1975 | Axer et al. . |
| 4,178,147 | 12/1979 | Hayashi . |
| 4,187,320 | 2/1980 | Koch et al. . |
| 4,266,920 | 5/1981 | Hayashi et al. . |
| 4,329,369 | 5/1982 | Tezuka et al. . |
| 4,555,407 | 11/1985 | Kramer et al. . |
| 4,850,842 | 7/1989 | Van Alstine . |
| 4,882,175 | 11/1989 | Ream et al. . |
| 4,917,839 | 4/1990 | Bold . |
| 4,940,594 | 7/1990 | Van Alstine . |
| 4,968,511 | 11/1990 | D'Amelia et al. . |
| 5,045,325 | 9/1991 | Lesko et al. . |
| 5,135,760 | 8/1992 | Degady et al. . |
| 5,205,106 | 4/1993 | Zimmerman et al. . |
| 5,324,530 * | 6/1994 | Kehoe et al. ............................ 426/5 |
| 5,397,580 | 3/1995 | Song et al. . |
| 5,419,919 | 5/1995 | Song et al. . |
| 5,538,742 | 7/1996 | McHale et al. . |

FOREIGN PATENT DOCUMENTS

| | | |
|---|---|---|
| 0 524 902 | 1/1993 | (EP) . |
| 0 273 809 | 7/1999 | (EP) . |
| WO 93/17579 | 9/1993 | (WO) . |

* cited by examiner

Primary Examiner—George C. Yeung

(57) ABSTRACT

A process and apparatus for the continuous production, processing and packaging of a final chewing gum product. The product is extruded as a continuous tape or ribbon of material, the material is flattened into a approximate final cross-sectional size and shape, and then inserted into a final sizing apparatus. The sizing apparatus maintains the gum product in its final cross-sectional size and shape. Thereafter, the continuous strip of final chewing gum product is scored, cut into individual pieces, and individually wrapped by a standard packaging machine. The individually wrapped pieces of gum can then be assembled into sets and packaged into packs of gum.

25 Claims, 4 Drawing Sheets

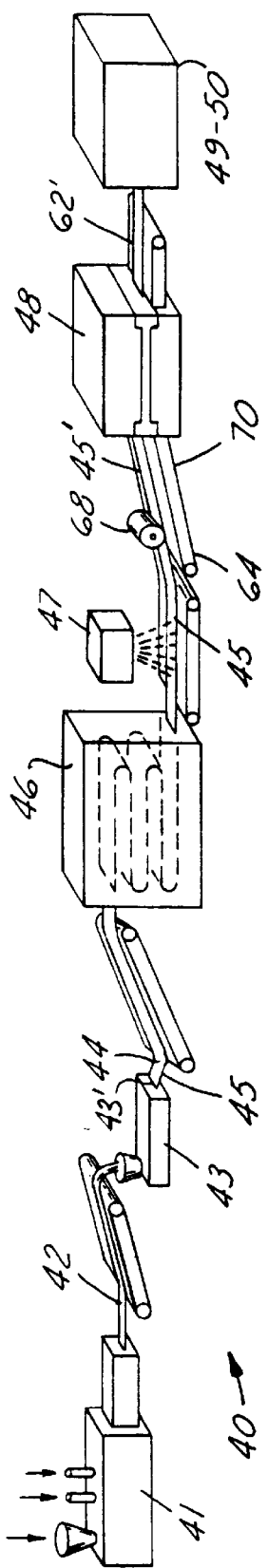
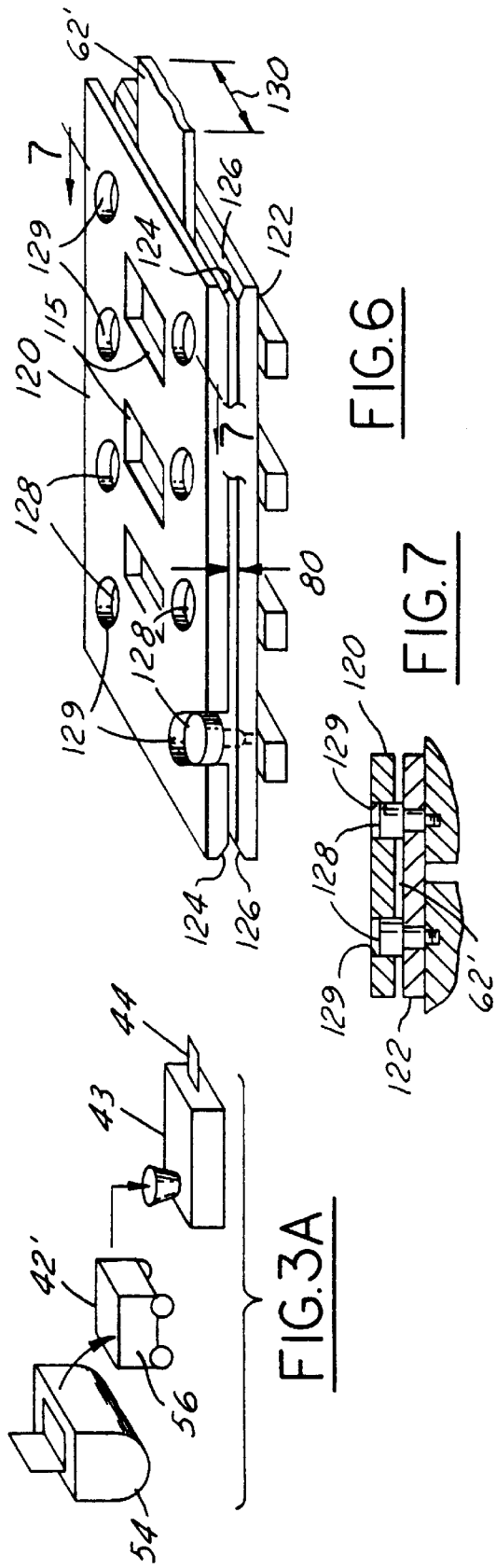
FIG.3
FIG.3A
FIG.6
FIG.7

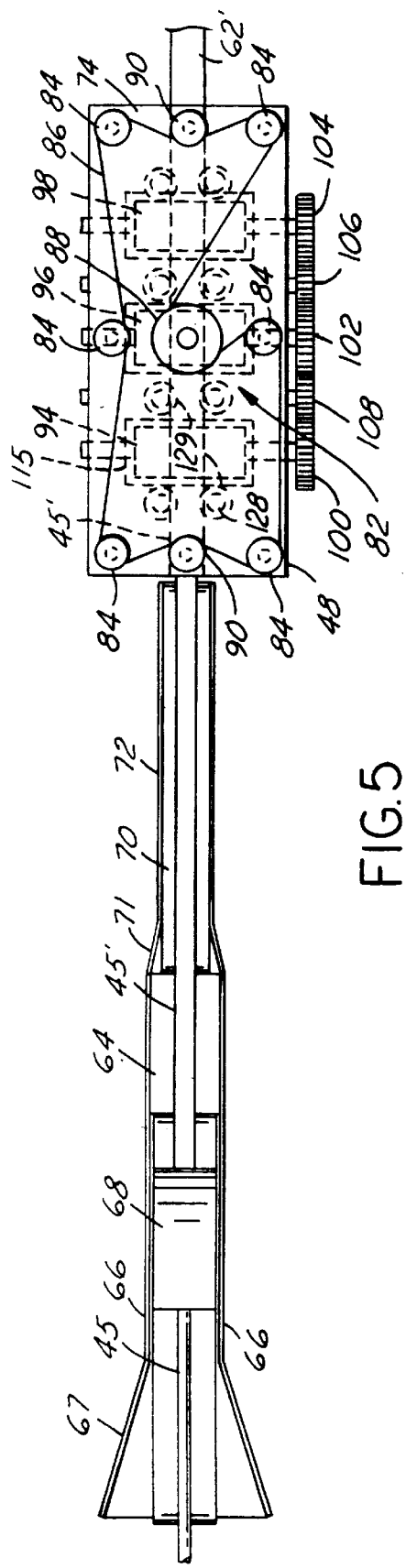
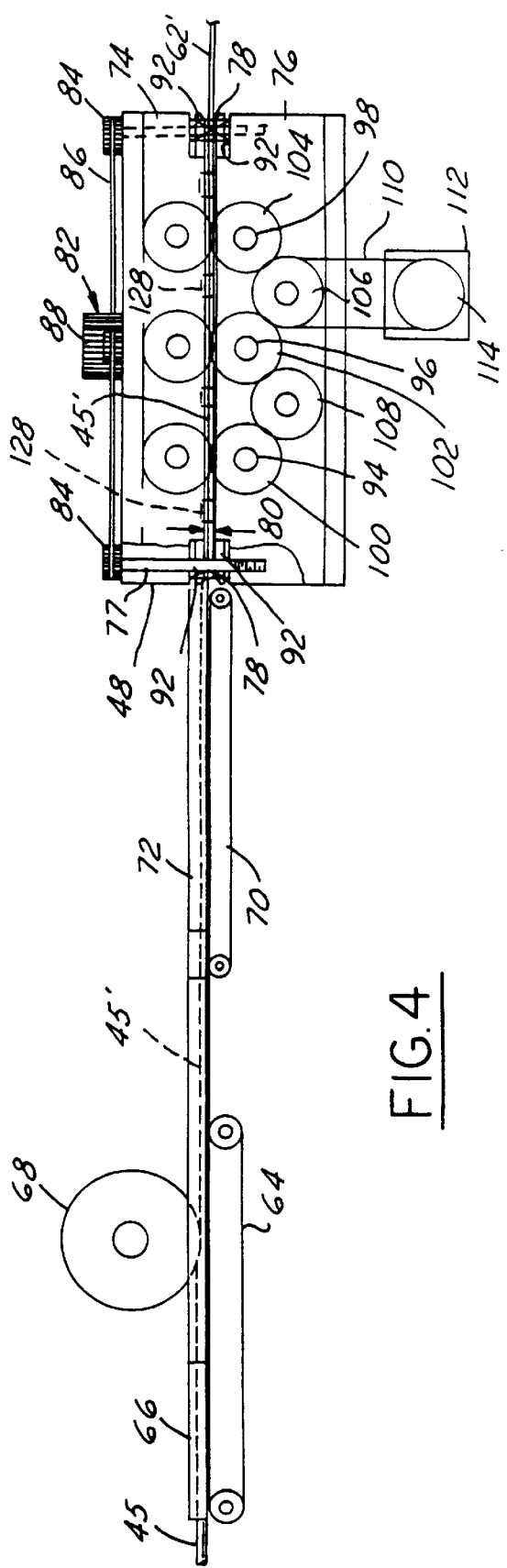
FIG. 5
FIG. 4

PROCESS FOR MANUFACTURING SLAB-TYPE CHEWING GUM PRODUCTS

CROSS-REFERENCE TO RELATED APPLICATIONS

This is a divisional of U.S. patent application Ser. No. 08/774,571, filed Dec. 31, 1996, now U.S. Pat. No. 5,971,739.

TECHNICAL FIELD

The present invention relates to improved making, processing and packaging of slab/stick-type chewing gum products.

BACKGROUND OF THE INVENTION

The process of making and packaging of slab/stick-type gum products is time-consuming and involves significant manual handling. Slab/stick-type gums, such as Trident® gum produced by Warner Lambert, are typically processed in batch kettles, divided into chunks by hand, formed into a wide, flat continuous sheet by an extruder machine, and then passed through rolling, scoring, and cutting machines. The sheets of scored gum are maintained in cooled conditioning rooms before they are wrapped and packaged. The sheets of gum product are taken to a packaging machine where they are first divided into elongated strips and then into individual pieces of gum and subsequently wrapped and packaged.

Some chunk-style gum products, such as bubble gum products, are formed into a rope-like configuration and fed directly from an extruder into a packaging machine. The product is roll formed into a generally square cross-sectional configuration and divided into individual pieces by a cutting mechanism. The individual pieces are then wrapped and packaged. One process which forms ropes of gum is shown, for example, in U.S. Pat. No. 4,940,594.

Heretofore, it has not been possible to utilize a continuous processing and packaging system for slab/stick-type chewing gum products packaged on standard slab gum wrappers. This is due to the fact that standard packaging machines require precisely sized and conditioned gum pieces for wrapping.

SUMMARY OF THE INVENTION

It is an object of the present invention to provide an improved apparatus and process for the preparation and packaging of slab-type and stick-type chewing gum.

It is another object of the present invention to provide an apparatus and process for continuously extruding, processing, and packaging of a slab/stick-type chewing gum product. It is an additional object of the present invention to provide an apparatus and method which eliminates much of the wasted time and manual handling of certain chewing gum products.

It is still another object of the present invention to provide an apparatus and process for forming a final chewing gum product into an elongated tape or ribbon of material, cooling and maintaining that tape within certain cross-sectional dimensions, and then feeding that strip directly to a wrapping and packaging machine. It is a still further object of the present invention to provide an apparatus which sizes and maintains a final chewing gum product in a flat tape-like configuration so that it can be fed directly to a standard packaging machine.

The present invention provides an apparatus and process for improved production, processing, and packaging of slab-type and stick-type chewing gum products. The gum product is preferably produced by a continuous extrusion process. The resultant molten gum product is formed into a continuous tape or ribbon of material by a second extrusion apparatus. The strand of gum material is passed through a cooling apparatus and into a final sizing mechanism. The sizing apparatus maintains the material in a precisely dimensioned size and shape configuration. The sizing apparatus includes a plurality of parallel and perpendicular rollers that form the continuously fed gum material to a final size and finish of high dimensional tolerances. The resultant material exiting from the sizing apparatus has the final specified cross-sectional size and shape.

Thereafter, the cooled and precisely formed continuous strip of material is fed into a cutting and packaging machine where the gum product is divided into individual pieces of gum product and individually wrapped. The wrapped individual pieces of gum product are formed into packs by the packaging machine, and the packs of gum material are subsequently assembled together in sets for commercial sale.

The present invention achieves some or all of the following advantages over present systems for producing and packaging slab/stick-type chewing gum products: faster cycle time, less work in progress, ability to process and package multiple flavors at the same time, improved process control, reduced labor expense, reduction of labor intensive repetitive operations, reduced material handling, and less complexity.

These and other aspects and features of the present invention will become apparent from the following description of the invention, when viewed in accordance with the accompanying drawings and appended claims.

BRIEF DESCRIPTION OF THE DRAWINGS

FIG. 3 is a schematic diagram of the preferred embodiment of the present invention, while FIG. 3A shows an alternate embodiment for a portion thereof;

FIG. 4 is a side view of a chewing gum sizing apparatus in accordance with the present invention shown;

FIG. 5 is a top elevational view of the sizing apparatus shown in FIG. 4;

FIG. 6 is a schematic view illustrating a portion of the sizing apparatus shown in FIGS. 4 and 5; and FIG. 7 is a cross-sectional view of the apparatus shown in FIG. 6, with the cross-sections being taken along line 7—7 in FIG. 6 and in the direction of the arrows.

BEST MODE(S) FOR CARRYING OUT THE INVENTION

The present invention is an improvement over known processes and apparatus for producing slab/stick-type final chewing gum products in a standard wrapper. These chewing gum products typically comprise small flat pieces of chewing gum on the order of 1¼ inches in length, ⅜ inches in width, and ⅙ inches in thickness. Commercial products of this type include the Trident® and Dentyne® products marketed by Warner Lambert Company.

Figure 1:
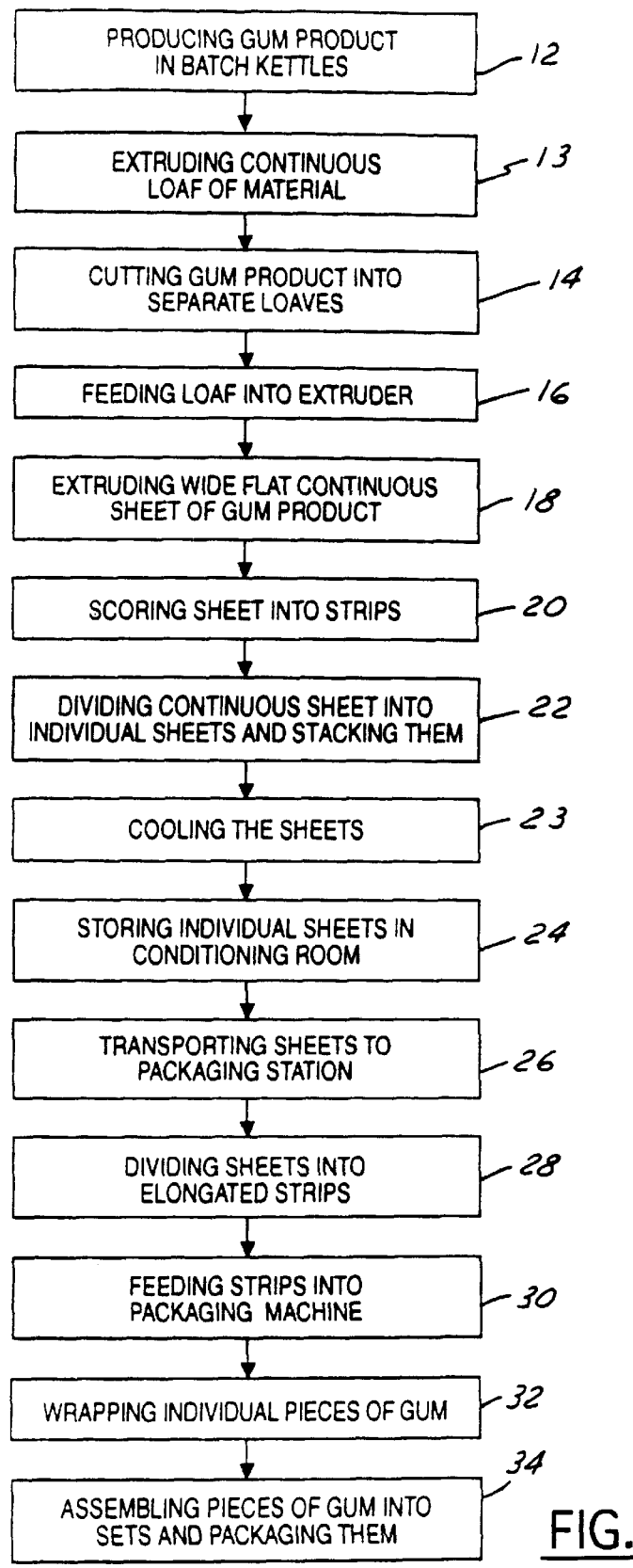
FIG. 1 is a flow diagram illustrating a prior art process of producing a slab-type chewing gum product.

FIG. 1 illustrates a known process for producing a slab-type chewing gum product. The process is generally referred to by the numeral 10. One example of a known process is shown, for example, in U.S. Pat. No. 4,555,407.

The chewing gum is typically produced in molten masses in batch-type kettles 12, such as a Sigma-blade kettle. Processes of this type are well-known in the art and are shown, for example, in U.S. Pat. Nos. 4,329,369 and 4,968,511.

The chewing gum base for the final chewing gum product can be produced separately, or added to the final chewing gum ingredients in the same kettle. Typically, the chewing gum base product is produced by another process, either a batch-type or continuous extruder-type process, and supplied to the final chewing gum kettles in solid or liquid form. Known processes and apparatuses for producing gum bases are shown, for example, in U.S. Pat. Nos. 4,187,320, 5,397,580 and 5,419,919. The chewing gum base is mixed with the various ingredients of the final chewing gum product, such as flavoring agents, sweeteners, fillers, coloring agents, softeners, and the like, and processed into the final product.

The mass of final chewing gum product is removed from the Sigma-blade kettles and processed by a pre-extruder apparatus 13 into a continuous loaf of material. The material is then manually cut and divided into individual chunks or "loaves" 14. The loaves of material are subsequently placed in an extrusion machine 16, either directly by hand or by means of conveyor belt which inserts the loaves into the extruder. The extrusion machine flattens the chewing gum product into wide, flat, continuous sheets of product 18. These sheets of gum are typically about 17¼ inches in width and about ⅙ inch in height.

The continuous sheet of gum product is then fed into a rolling and scoring machine 20 where the slab of material is scored longitudinally into an equal number of elongated strips, approximately 1¼ inches in width. After being scored, the wide, flat, scored continuous sheet of material is cut and divided by a rotary cutter into individual sheets approximately 17–18 inches in length 22. The sheets are conveyed through a cooling tunnel or chamber 23 where they are cooled sufficiently for handling. The individual sheets are then stacked by hand onto wood trays and moved into a cooled conditioning room 24. The conditioning room controls the humidity and temperature of the product. The stacked scored sheets of gum product are maintained in the cooling room for anywhere from a few hours to 4–7 days, depending on the time needed to sufficiently condition the material for packaging.

When it is desired to further process and package the chewing gum product, the stacked sheets are transported manually to a packaging station 26. At that point, the sheets are divided manually (along the score lines) into elongated strips 28 about 1¼ inches wide and the strips are fed manually into the packaging machine 30. The machine 30 divides and cuts the gum material into individual pieces of slab-type gum of final size and shape (1¼×⅜×⅛ inches) and wraps them individually 32. Thereafter, the packaging machine assembles the individually wrapped pieces of gum into sets and packages them into a pack of gum 34. Thereafter, if desired, the packs of gum are assembled into individual multi-packages (not shown) for commercial display and sale.

It is important that the individual pieces of gum be provided to the wrapping section of the packaging machine 30 in a precise size, shape and finish. If the pieces are not precisely sized, then the wrappers will not be applied properly or efficiently to them.

Figure 2:
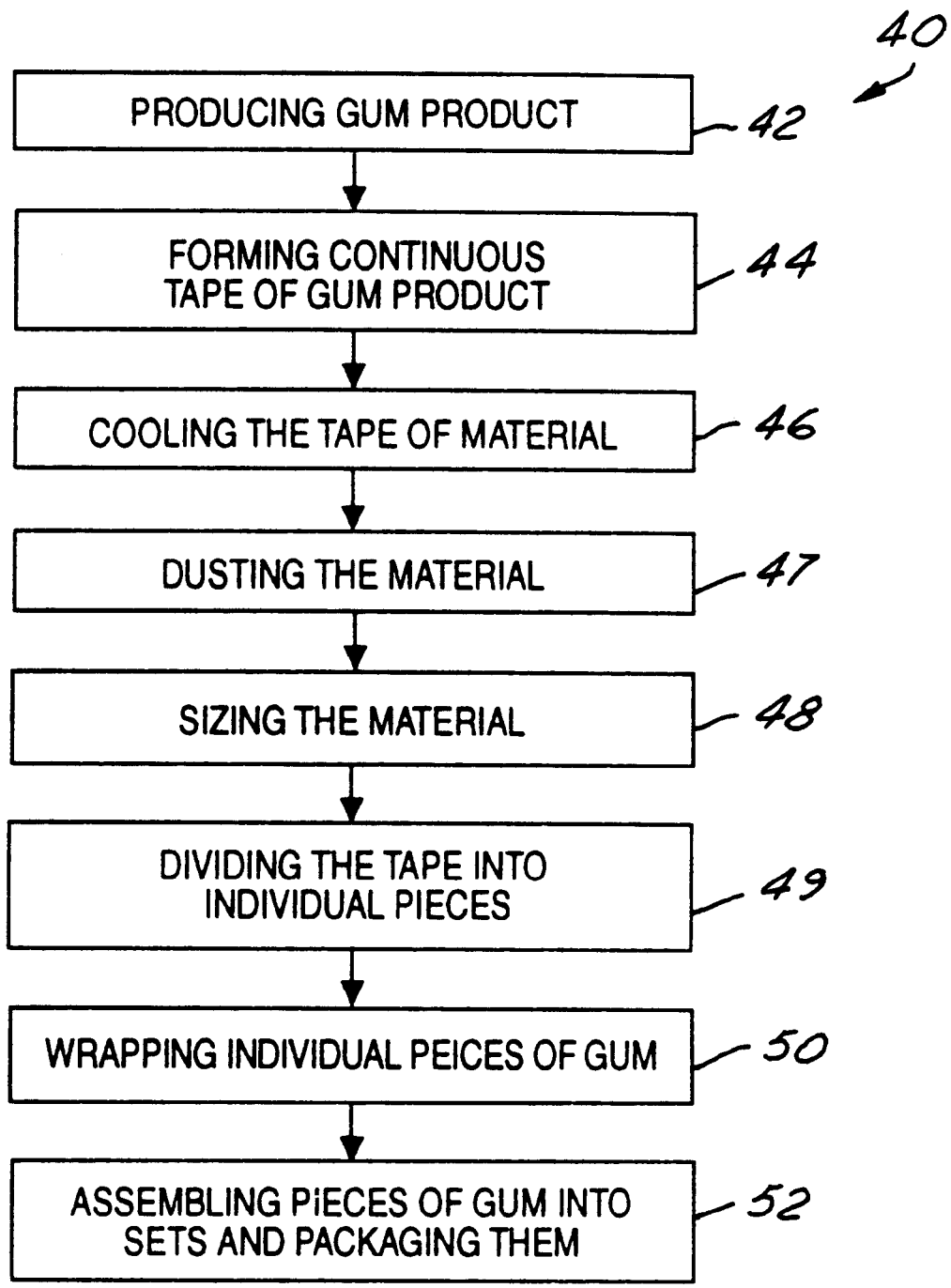
FIG. 2 is a flow diagram depicting the preferred inventive process in accordance with the present invention.

The processing steps in accordance with the present invention are shown in FIG. 2, and a schematic diagram of the processing equipment is depicted in FIG. 3 (with an alternative embodiment shown in FIG. 3A). The inventive process is generally referred to by the reference numeral 40. As a first step, the final chewing gum material is produced 42, either by conventional batch kettles, or preferably in a continuous extrusion process. Apparatus and processes for continuously extruding a final chewing gum product are shown, for example, in U.S. Pat. Nos. 5,045,325 and 5,135,760.

The mass of chewing gum material is then fed into an extruding machine which extrudes it into a continuous tape or ribbon of material 44. The tape is preferably about 1¼ inches wide and about ⅙ inch (0.0167 inches) in height. Thereafter, in accordance with the present invention, the continuous tape or ribbon of material is subjected to cooling 46. The chewing gum product is continuously fed into and through a cooling chamber or tunnel 46 where its temperature is reduced from over 100° F. to below 80° F.

Once the tape of gum product is cooled, it is dusted 47 with a powder material, such as mannitol/trilite, to aid in subsequent handling. Thereafter, the continuous tape (strip) of final chewing gum material is sent through a sizing apparatus 48 which precisely controls the cross-sectional size and shape of the gum. (The sizing apparatus is set forth in more detail in FIGS. 4–6.)

The sized tape or ribbon of material is then divided into elongated strips of material by a rotating cutter and submitted to a standard packaging machine 49–50. The packaging machine divides the material with a rotary cutter into individual pieces of gum 49. The individual pieces of gum are individually wrapped. Finally, the individually wrapped pieces 50 of chewing gum product are assembled into sets and packaged into packs of gum 52. The individual packs of gum are boxed or packaged into bags in a conventional manner for commercial display and sale, as known in the art.

FIG. 3 schematically illustrates the preferred equipment and apparatus used with the inventive process. FIG. 3A shows an alternative process where a batch-type process is used to make the final chewing gum product.

As shown in FIG. 3, the final gum base ingredients, such as the gum base, flavoring agents, sweeteners, fillers, coloring agents, softeners, and the like, are added to a continuous extruder apparatus 41. The final gum product 42 is fed into a second extruding apparatus 43 which produces an elongated tape or ribbon 44 of material. The gum product 42 can be fed directly into the extruder 43, as shown, or extruded into a cart or the like and then dumped or otherwise introduced into the extruder 43. The downstream end of the extruder 43 has an extrusion die 43' which causes the material to be extruded in the desired shape. At this point, the tape 44 is continuous and has a cross-section preferably about 1¼ inches in width and ⅙ inches (0.0167) inches) in height.

The tape 44 exiting from extruder 43 is at an elevated temperature (about 100° F.) and needs to be cooled approximately to room temperature (about 70–75° F.) for further processing. Thus, the tape of material 44 is passed through a cooling chamber or tunnel 46. The cooling chamber can be of any conventional type, but preferably is a 9-Pass Dx unit from Greer. Upon exiting the cooling chamber 46, the tape of material is lightly dusted with a powder by sprinkler apparatus 47. The continuous material 45 is then passed through the sizing apparatus 48 and conveyed directly to a standard or conventional packaging machine 49–50. In the packaging machine, the material is cut into individual pieces by a rotating cutter (not shown) and then the separate pieces are wrapped individually.

In an alternative procedure, the continuous type of material 45 exiting from the cooling chamber 46 or from the sizing apparatus 48 can be cut into 17¼ inch lengths. For this purpose, a rotary cutting apparatus (not shown) can be positioned downstream of either the chamber 46 or sizing apparatus 48. Some conventional packaging machines need a fixed length of a strip of gum product for further processing.

As indicated above, the present invention can be used with a final chewing gum material which has been made by a continuous extrusion process (as shown in FIG. 3), or which has been produced by a batch-type process. The latter is shown in FIG. 3A. The chewing gum product 42' is made in a batch kettle 54 and dumped into a cart 56 or similar conveyance apparatus. The material is then deposited into an extrusion machine, such as extruder 43, where it is extruded as a tape or ribbon 44 of a prespecified size and shape. The remainder of the batch-type process is the same as that shown above with reference to FIG. 3.

Although it is noted above that the gum base material is added to the continuous extruder 41 or batch-kettle 54 along with the other ingredients of the final gum material, it is also possible to use a continuous extrusion processor and prepare the final gum material in one continuous process. This is shown, for example, in U.S. Pat. Nos. 5,045,325 and 5,135,760. Also, if the gum base is produced separately, it can be produced by any known or conventional process, such as with a continuous extruder or a batch-type apparatus. Production of gum bases with these procedures are shown, for example, in U.S. Pat. Nos. 4,187,320, 5,397,580 and 5,419,919.

A comparison of the processes shown in FIGS. 1 and 2, show that the present invention substantially simplifies the gum processing and packaging process. The invention is significantly more efficient and much less labor-intensive than the prior art processes. Immediately after the gum product is made, it is extruded into a tape or ribbon, cooled in a cooling chamber, perfected in size in a sizing apparatus, and then immediately cut and packaged. The forming-cooling-packaging process takes on the order of minutes, rather than hours or days, as experienced with prior art processes.

The present invention not only is more efficient than prior art processes, but improves the final gum quality and shelf life. The quality of the final gum product is improved because it is not subject to age effects or risks of contamination known in prior art processes. Potential for product mix up or cross-contamination with other flavors of chewing gum products in the conditioning room are eliminated. Also, plant spaced devoted to the production and inventory of slab-type chewing gum products will be reduced.

Further, the number of packaging machines required for a continuous packaging operation is reduced from that required with prior art processes. The reduction is due in part to the increase in packaging efficiencies from the increased production time and higher rates of production. If the batch kettles are replaced with extrusion processing equipment, and multiple rolling and scoring mechanisms are eliminated, then the amount of capital, equipment and plant space necessary to produce the final chewing gum product is similarly reduced. This also simplifies operation and maintenance by reducing the amount of equipment that needs to be maintained.

Further benefits and advantages of the present invention include: faster cycle times, minimization or elimination of work in progress, ability to process multiple flavors of gum products at the same time, improved process control, reduced material handling and less complexity.

A preferred sizing apparatus used to perfect the final slab-type chewing gum product in its final form before packaging is shown in FIGS. 4–7. The apparatus is generally referred to by the numeral 48. As shown in FIGS. 4 and 5, the tape or ribbon 45 of final chewing gum product is positioned on a first conveyor belt apparatus 64. The top of the conveyor belt is flanked by side rails 66 which help keep the material in line. A first roller 68 is positioned over the conveyor belt 64 and used to firmly retain the tape of final gum material 45 in its shape as a flat continuous strip of material 45'. A second conveyor belt apparatus 70 is used to transport the material into the sizing apparatus 48. A second set of side rails 72 are used to assist in keeping the flat strip of material on the conveyor belt 70.

Preferably, angled or flared lead-in sections 67 and 71 are used in combination with side rails 66 and 72, respectively. The sizing apparatus 48 is preferably made of a food grade metal, such as stainless steel, and has an upper member 74 and a lower member 76. The two members 74 and 76 are positioned one on top of the other as shown in FIG. 4 and are guided and held in place by a plurality of elongated guide pins 77 (one shown in FIG. 4) and a plurality of coil biasing springs 78. The pins 77 keep the two halves 74 and 76 in alignment. The springs 78 are used to assist in positioning the upper and lower halves 74 and 76 evenly relative to one another so that the space 80 between them has a constant dimension.

The two halves 74 and 76 are primarily maintained an equal distance apart by a uniform leveling mechanism 82. That mechanism includes a series of threaded pins 84 positioned in the four corners of the apparatus 48 and along the two sides. A continuous chain 86 operated by an adjustment wheel 88 is used to simultaneously turn and adjust all of the threaded pins 84. A pair of tension wheels 90 are also used as part of the leveling mechanism 82 in order to maintain the chain 86 in tension.

The coil springs 78 are positioned in cut-out sections 92 which are provided along both ends of the apparatus 48. The springs 78 maintain a constant tension between the upper and lower halves 74 and 76 and act in cooperation with the leveling mechanism 82 in order to maintain the accuracy of the width of the space 80.

Three sets of parallel rollers, 94, 96 and 98 are used to roll and regulate the thickness of the strip of material 45' inside the apparatus 48. The sets of rollers 94, 96 and 98 are driven by gear members 100, 102 and 104, respectively, which, in turn, are driven by primary drive gear 106 and a secondary drive gear 108. In this regard, drive gear 106 is driven by chain 110 connected to motor 112. The motor 112 drives gear 114 which, in turn, through chain 110, drives gear 106. Gear 106, in turn, drives gears 102 and 104 and thus drives sets of rollers 96 and 98. Gear 102 also drives gear 108 which, in turn, drives gear 100 and roller set 94.

Upper member 74 of apparatus 48 has a metal plate 120 connected to it which is positioned in axial alignment with the strip of material 45 (see FIG. 6). Similarly, lower member 76 of apparatus 48 has a corresponding elongated metal plate 122 connected to it. The plates 120 and 122 are opposed to each other and used to define the space 80 in which the chewing gum product 62 is passed through. The plates 120,122 have openings 115 in them for positioning of the rollers 92,94 and 96. For ease of entrance and exit of the chewing gum material 45' into and out of the space 80, the front and rear edges of the plate 120 and 122 are angled or chamfered, such as shown by numerals 124 and 126, respectively, in FIG. 6.

A plurality of sets of vertically arranged roller/guide members 128 are positioned in openings 129 in the flat plates 120 and 122. In this regard, for ease of understanding, the drawings only show one roller 128 in FIG. 6 and two rollers 128 in FIG. 7; however, the rollers are positioned in pairs and preferably four sets of rollers are positioned on the sides of the gum material in space 80. The roller members are preferably made from a metal material, such as stainless steel. The roller/guide members 128 define the precise width 130 of the final chewing gum product 62'.

Thereafter, the continuous strip of final chewing gum product 45', which has its final cross-sectional size, shape, and finish is passed into a standard slab/stick-type gum wrapping machine 49–50. The strip or tapes of material 62' are divided by a rotary cutter into individual pieces and wrapped. Once the individual pieces are wrapped, they are assembled in sets or packs. Thereafter, the final packages of gum are subjected to conventional handling and further processing.

While the best modes for carrying out the invention have been described in detail, those familiar with the art to which this invention relates will recognize various alternative designs and embodiments for practicing the invention as defined by the following claims.

What is claimed is:

1. A process for manufacture of slab-type chewing gum comprising:
    producing a portion of chewing gum material;
    forming said material into a continuous tape of material having a first cross-sectional size and shape;
    sizing said material to form a continuous tape of material having a second cross-sectional size and shape;
    said sizing step comprising:
        introducing said tape of material into a space in a housing between an upper plate member and a lower plate member, said upper and lower plate members forming an elongated flat passageway through the housing;
        compressing said tape of material in said space with first, second, and third roller members, said first and second roller members being positioned in openings in said upper and lower plate members, respectively, and thereby setting the height of said continuous tape of material, and said third roller member being positioned in said housing and thereby setting the width of said continuous tape of material; and
        separating said sized continuous tape of material into individual pieces of material.

2. The process as set forth in claim 1 wherein said steps of producing and forming said material comprise mixing gum material ingredients in a continuous extruder and extruding said material through a die.

3. The process as set forth in claim 1 further comprising the step of cooling said formed continuous tape of material.

4. The process as set forth in claim 1 further comprising the step of continuously wrapping said individual pieces of material.

5. The process as set forth in claim 4 further comprising the step of continuously assembling said individually wrapped pieces of material into packs of chewing gum.

6. The process as set forth in claim 1 wherein said step of separating said material comprises cutting the material with a rotary cutter mechanism.

7. The process as set forth in claim 1 further comprising the step of adjusting the distance between said upper and lower plate members in order to adjust the second cross-sectional size and shape of said continuous tape of material.

8. The process as set forth in claim 1 further comprising the step of biasing said upper and lower plate members relative to one another.

9. The process as set forth in claim 1 further comprising the step of adjusting said upper and lower plate members substantially parallel to one another to form a substantially uniform space in said housing for passage of said material.

10. The process as set forth in claim 1 further comprising the steps of positioning said first and second roller members substantially horizontally in said housing and positioning said third roller members substantially vertically in said housing.

11. The process as set forth in claim 1 further comprising the step of providing chamfered means on said upper and lower plate members to allow easier introduction of said tape of material into said elongated flat passageway.

12. The process as set forth in claim 1 wherein said first and second roller members each comprise a plurality of individual roller members, and said individual roller members of said first and second roller members are positioned in mating spaced apart pairs in order to size the height of said continuous tape of chewing gum material.

13. The process as set forth in claim 1 wherein said third roller members comprises a first set of a plurality of individual roller members positioned along one side of said elongated flat passageway and a second set of a plurality of individual roller members positioned along the opposite side of said elongated flat passageway, said first and second sets of roller members cooperating to size the width of said continuous tape of chewing gum material.

14. The process as set forth in claim 7 wherein said means for adjusting the distance comprises a plurality of rotatable pin members operably connected to said upper plate member, a chain member operably connecting together said plurality of pin members, a tensioning device on said housing for tensioning said chain member, and an adjustment member for operatively adjusting said chain member in order to rotate said pin members and thereby adjust the position of said upper plate member relative to said lower plate member.

15. A process for manufacture of slab-type chewing gum comprising:
    producing a portion of chewing gum material;
    forming said material into a continuous strip of material having a cross-sectional size and shape;
    introducing said strip of material into a space in a housing between an upper plate member and a lower plate member, said upper and lower plate members forming an elongated first passageway through the housing; and
    compressing said strip of material in said space with first, second, and third roller members, said first and second roller members being positioned in openings in said upper and lower plate members, respectively, and thereby setting the height of said continuous strip of material, and said third roller members being positioned in said housing and thereby setting the width of said continuous strip of material.

16. The process as set forth in claim 15 wherein said steps of producing and forming said material comprise mixing gum material ingredients into a continuous extruder and extruding said material through a die.

17. The process as set forth in claim 15 further comprising the step of cooling said formed continuous strip of material.

18. The process as set forth in claim 15 further comprising the steps of separating said continuous strip of material into individual pieces of material and continuously wrapping said individual pieces of material.

19. The process as set forth in claim 18 further comprising the step of continuously assembling said individually wrapped pieces of material into packs of chewing gum.

20. The process as set forth in claim 15 further comprising the step of adjusting the distance between said upper and lower plate members in order to adjust the cross-sectional size and shape of said continuous strip of material.

21. The process as set forth in claim 15 further comprising the step of biasing said upper and lower plate members relative to one another.

22. The process as set forth in claim 15 further comprising the step of adjusting said upper and lower plate members substantially parallel to one another to form a substantially uniform space in said housing for passage of said material.

23. The process as set forth in claim 15 further comprising the steps of positioning said first and second roller members substantially horizontally in said housing and positioning said third roller members substantially vertically in said housing.

24. The process as set forth in claim 15 wherein said first and second roller members each comprise a plurality of individual roller members, and said individual roller members of said first and second roller members are positioned in mating spaced apart pairs in order to size the height of said continuous strip of chewing gum.

25. The process as set forth in claim 15 wherein said third roller members comprises a first set of plurality of individual roller members positioned along one side of said elongated flat passageway and a second set of a plurality of individual roller members positioned along the opposite side of said elongated flat passageway, said first and second sets of roller members cooperating to size the width of said continuous strip of chewing gum material.

\* \* \* \* \*